United States Patent

[11] 3,587,422

| [72] | Inventor | Alfred Kilgus<br>Stuttgart-Wangen, Germany |
|------|----------|--------------------------------------------|
| [21] | Appl. No. | 745,158 |
| [22] | Filed | July 16, 1968 |
| [45] | Patented | June 28, 1971 |
| [73] | Assignee | Eastman Kodak Company<br>Rochester, N.Y. |
| [32] | Priority | July 29, 1967 |
| [33] | | Germany |
| [31] | | P 16 50 977.6 |

[54] COUPLING DEVICE FOR A CAMERA
18 Claims, 4 Drawing Figs.

[52] U.S. Cl. .................................................. 95/11,
287/52.08, 350/257
[51] Int. Cl. ....................................................... G03b 19/00
[50] Field of Search............................................ 95/11, 44;
350/257, (Inquired); 287/1, 136 (Cam Eccentric),
52.08, (Inquired)

[56] References Cited
UNITED STATES PATENTS
| 739,587 | 9/1903 | Case | 95/11 |
| 2,461,357 | 2/1949 | Broido et al. | 95/11 |
| 2,842,030 | 7/1958 | Geddes | 350/257 |

Primary Examiner—Samuel S. Matthews
Assistant Examiner—Fred L. Braun
Attorneys—Robert W. Hampton and William C. Dixon, III ABSTRACT: A device for coupling a pair of movable members, particularly a pair of concentrically oriented, rotatable members, includes a stud having a cylindrical main portion rotatably mountable in one of the members and a conical eccentric portion fixed to the cylindrical main portion for rotation with the main portion to a position of coupling engagement with the other of the members. In the illustrated embodiment, the one member is the setting ring and the other member is the lens barrel of a photographic or cinematographic camera. The stud is receivable in a radial, smooth-bored hole in the setting ring, and the cylindrical main portion is skewed in the hole when the conical eccentric portion is rotated to a position of coupling engagement with a mating surface on the lens barrel. The stud is preferably made of an elastic plastic material, so that the conical eccentric portion is deformable by serrations on the mating surface of the lens barrel to prevent accidental reverse rotation of the stud and consequent uncoupling of the two members.

ALFRED KILGUS
INVENTOR.

BY William C. Dixon, III
Robert W. Hampton

ATTORNEYS

COUPLING DEVICE FOR A CAMERA

BACKGROUND OF THE INVENTION

1. Field of the Invention

This invention relates to a device for coupling a pair of movable members, and particularly to a device for coupling a pair of concentrically oriented, rotatable members such as the setting ring and lens barrel of a photographic or cinematographic camera.

2. Description of the Prior Art

It is well known in the art to couple a pair of concentrically oriented, rotatable members, such as the setting ring and lens barrel of a camera, by means of threaded pins receivable in corresponding threaded holes in one of the members, such as the setting ring of a camera, whereby an end portion of each threaded pin bears against a surface on the other of the members, such as the lens barrel of a camera. Such means pose the disadvantage of requiring relatively expensive threading and tapping operations on the pin and hole, respectively, as well as the use of relatively expensive machinable steel for the pins.

SUMMARY OF THE INVENTION

The present invention comprises a simple, inexpensive, and practical device for coupling a pair of movable members, particularly a pair of concentrically oriented, rotatable members such as the setting ring and lens barrel of a camera. The device includes a stud rotatably mountable in one of the members and having an eccentric portion engageable with the other of the members to couple the members, one with the other. In the illustrated preferred embodiment of this invention, the stud comprises a cylindrical main portion which is rotatably mountable in the one member and a conical eccentric portion fixed to one end of the cylindrical main portion for rotation with the main portion to a position of coupling engagement with the other of the members. Also in the illustrated preferred embodiment, means such as a slot in the other end of the cylindrical main portion are provided for receiving an externally applied turning force, as by an ordinary screwdriver, by which the stud can be rotated between a position in which the two members are uncoupled and a position in which the two members are thereby coupled.

The various objects and advantages of this invention will become apparent in the detailed description of the illustrated preferred embodiment appearing below, and the novel features thereof will be particularly pointed out in connection with the appended claims.

BRIEF DESCRIPTION OF THE DRAWING

In the preferred embodiment described below, reference is made to the accompanying drawing, in which.

DESCRIPTION OF THE PREFERRED EMBODIMENT

Figure 2:
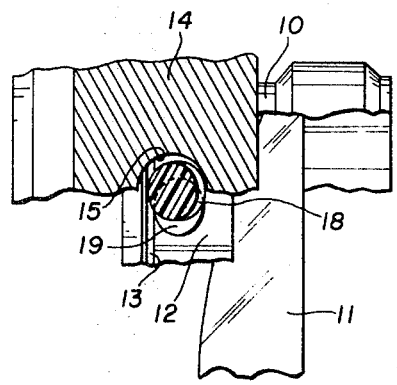
FIG. 2 is a partial cross-sectional view taken along line 2-2 of FIG. 1.

The embodiment illustrated in the drawing comprises, for a photographic or cinematographic camera, a lens barrel 10 containing a lens 11 and having a slanted surface 12 with abrading means such as serrations 13 at the upper end thereof. Concentrically disposed around lens barrel 10 is a setting ring 14 having a radially oriented, smooth-bored hole 15 with a counterbore 16. Inserted in hole 15 is a stud 17. Stud 17 includes a cylindrical main portion 18 which is rotatable in hole 15. Fixed to cylindrical main portion 18, or integral therewith, at the lower end of the main portion is a conical eccentric portion 19. At the upper end of cylindrical main portion 18 is shown a slot 20 for receiving the blade of a screwdriver, by means of which stud 17 can be turned in hole 15.

Figure 4:
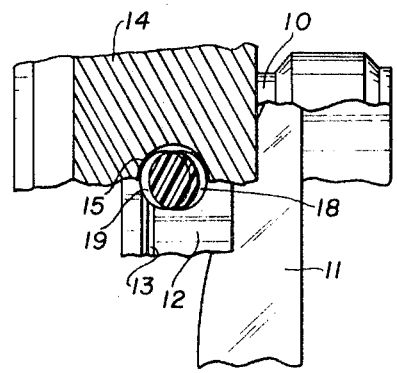
FIG. 4 is a partial cross-sectional view taken along line 4-4 of FIG. 3.
Figure 1:
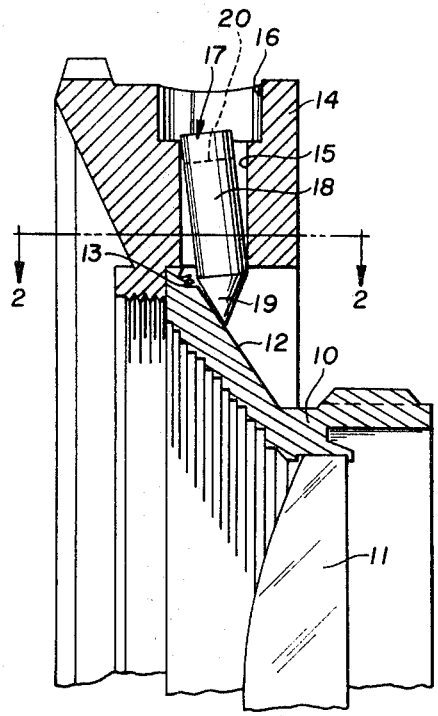
FIG. 1 is a partial cross-sectional view of the setting ring and lens barrel of a camera, showing the device of the present invention in an uncoupled position.
Figure 3:
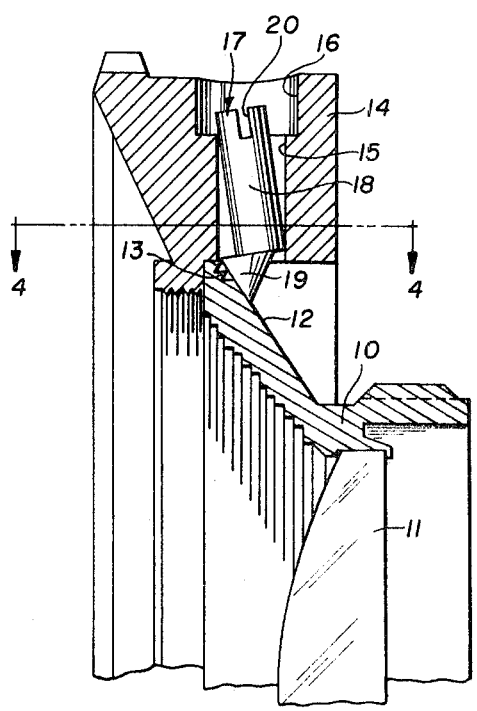
FIG. 3 is a partial cross-sectional view of the setting ring and lens barrel of a camera, showing the device of the present invention in its coupled position.

FIGS. 1 and 2 show stud 17 in a position in which lens barrel 10 and setting ring 14 are not coupled. FIG. 2 illustrates particularly the orientation of conical eccentric portion 19 when stud 17 is in an uncoupled position. FIGS. 3 and 4 show stud 17 after it has been rotated clockwise, as viewed in FIG. 4, to a position in which lens barrel 10 and setting ring 14 are thereby coupled. FIG. 4 illustrates particularly the orientation of conical eccentric portion 19 when stud 17 is in its coupled position. As can be seen by a comparison of FIGS. 3 and 4 with FIGS. 1 and 2, rotation of stud 17 to effect coupling of lens barrel 10 and setting ring 14 causes conical eccentric portion 19 to be rotated in a direction toward slanted surface 12 of lens barrel 10 for engagement with serrations 13 on surface 12. Serrations 13 are provided on surface 12 to retain conical eccentric portion 19 in its coupled position, i.e., to prevent accidental reverse rotation of stud 17 and consequent uncoupling of lens barrel 10 and setting ring 14. As can be seen in FIGS. 1 and 3, stud 17, in both its uncoupled and coupled positions, is skewed in hole 15, whereby rotation of stud 17 causes the desired angular displacement of conical eccentric portion 19 relative to mating surface 12 on lens barrel 10.

Stud 17 is preferably made of a material that is softer than that of lens barrel 10, preferably an elastic plastic material, by use of which stud 17 can be inexpensively produced and eccentric conical portion 19 can be readily deformed when wedged against serrations 13 on surface 12. As should be apparent, serrations 13 could take any one of several forms such as recesses, grooves, slots, or other abrading means to retain conical eccentric portion 19 in coupling engagement with surface 12.

The invention according to the illustrated embodiment provides a convenient means not only for coupling lens barrel 10 and setting ring 14 but also for uncoupling those two members when desired. To effect such uncoupling, stud 17 is merely rotated in the reverse direction to cause conical eccentric portion 19 to be rotated away from surface 12.

Manufacture of stud 17, particularly by the use of plastic, is relatively inexpensive, and the cost of manufacturing lens barrel 10 and setting ring 14 according to the present invention is considerably lower than it would be if the conventional coupling means utilizing threaded pins and tapped holes were used, so that the invention as a whole represents an appreciable reduction in manufacturing cost.

It should be apparent that the device of the present invention is adaptable for use in coupling movable members other than the lens barrel and setting ring of a photographic or cinematographic camera. The invention is contemplated to embrace other applications in which coupling of two movable members is desired. Thus, the invention has been described in detail with particular reference to a preferred embodiment thereof, but it will be understood that variations and modifications can be effected within the spirit and scope of the invention as described hereinabove and as defined in the appended claims.

I claim:

1. In a camera, a device for coupling a relatively movable setting ring member and a lens barrel member, one of the members having a mating surface, said device comprising a stud having:
   a. a cylindrical main portion rotatably mountable in the other member; and
   b. a portion fixed to an eccentrically oriented relative to said cylindrical main portion for rotation with said main portion to a position in which a surface of said eccentric portion is in coupling engagement with the mating surface of said one member.

2. The device claimed in claim 1 wherein said eccentric portion is at one end of said cylindrical main portion.

3. The device claimed in claim 2 wherein said cylindrical main portion includes means for receiving externally applied turning force.

4. The device claimed in claim 3 wherein said stud is made of a material softer than that of said other member.

5. The device claimed in claim 4 wherein said stud is made of an elastic plastic material.

6. In a camera, in combination with concentrically oriented, relatively rotatable setting ring and lens barrel members, a device for coupling said members comprising a stud having a cylindrical main portion rotatably mounted in one of said members and a conical eccentric portion fixed to said cylindrical main portion for rotation with said main portion to a position in which a conical surface of said eccentric portion is in coupling engagement with a mating surface of the other of said members.

7. The combination claimed in claim 6 wherein said conical eccentric portion is at one end of said cylindrical main portion.

8. The combination claimed in claim 7 wherein said mating surface of said other member includes abrading means for retaining said conical surface of said eccentric portion in coupling engagement with said mating surface.

9. The combination claimed in claim 8 wherein said one member includes means defining a radially oriented cylindrical bore for receiving said stud in a substantially radial orientation relative to the axis of rotation of said one member.

10. The combination claimed in claim 9 wherein said radially oriented bore includes first and second open ends, said first end being radially farther than said second end from said other member, wherein said stud is received through said first open end, and wherein said conical eccentric portion projects through said second open end toward said other member.

11. The combination claimed in claim 10 wherein said cylindrical main portion is rotatable in said bore between a first position in which said conical surface of said eccentric portion is not in coupling engagement with said mating surface of said other member and a second position in which said conical surface of said eccentric portion is in coupling engagement with said mating surface of said other member.

12. The combination claimed in claim 11 wherein said cylindrical main portion is skewed in said bore when in said second position.

13. The combination claimed in claim 12 wherein said stud is made of a material softer than that of said other member.

14. The combination claimed in claim 13 wherein said stud further includes means for receiving externally applied turning force.

15. The combination claimed in claim 14 wherein said one member is the radially outer member and said other member is the radially inner member.

16. The combination claimed in claim 15 wherein said outer member is the setting ring member and said inner member is the lens barrel member of the camera.

17. In a camera having a rotatable setting ring and a lens barrel concentrically oriented within the setting ring, the improvement comprising:
   a. a surface on the lens barrel;
   b. abrasive means on said surface;
   c. means on the setting ring defining a cylindrical bore substantially radially oriented relative to the rotational axis of the setting ring; and
   d. a stud rotatably carried in said bore, said stud having a cylindrical main portion and a portion eccentrically oriented relative to said main portion, said eccentric portion being rotatable between a first position wherein said eccentric portion engages said abrasive means of said surface to couple the setting ring to the lens barrel, and a second position wherein the eccentric portion does not couple the setting ring to the lens barrel.

18. The improvement defined in claim 17 wherein said surface on the lens barrel is tapered and said eccentric portion is tapered.